BEST AVAILABLE COPY
8,719 X
Sheet 1-3 Sheets.
C. Bassett,
Dressing Leather,
Patented Mar. 25, 1835.
Fig. 1. Plan.
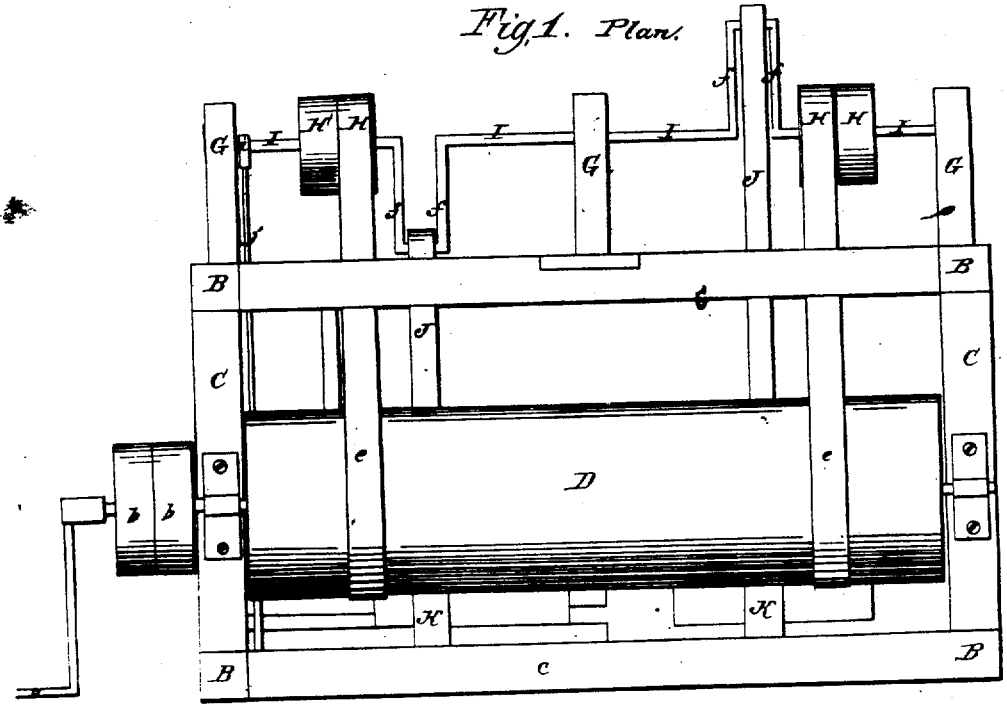

03 8719X Mar. 25. 1835

Cushman Bassett of Boston Massachusetts

Letters Patent

The Schedule referred to in these Letters Patent and making part of the same containing a description in the Words of the said Cushman Bassett himself of his improvement called the Leather Dresser To all persons to whom these presents shall come. Cushman Bassett of Boston in the County of Suffolk and State of Massachusetts. Trader, sends Greeting. Be it known that I the said Cushman Bassett have invented constructed made and applied to use a new and useful improvement in the art of finishing Morocco and Kid Skins. breaking Goat and other Skins. setting and graining commonly called Boarding Skins. also for working all kinds of hides used in curried Leather and finishing the same. which I call the Leather Finisher. And my invention and improvement is by me fully specified and described in the words and figures following "to wit". I make a Platform on which the operator stands on the front part of which are two boards inclining obliquely before him at a convenient height for his operation. the one of them stationary and the other moveable in the manner herein after described. and as is represented in the model and drawings herewith presented. On the stationary board a Bar is made to pass. with a Brush. Roller. or hard piece of wood at the end of it at the pleasure of the operator over the leather to be finished. which Leather must be moved from place to place during the operation of finishing. at the pleasure of the operator who will manage and move the Leather and place it under the Roller by manipulation. The moveable board is made to move by the machinery herein after described as represented in the Model and drawings herewith sent. and it is for the same purpose of finishing skins by polishing them in a different mode. under the management of the operator. all of the said modes are fully described in the model and drawings herewith sent and herein described. The object of this Invention is to give the operator in finishing the skins and various preparations of leather as aforesaid the power to proceed and effect his work by exact mechanical

8719X operation with much greater perfection and with more facility than could be done in any of the ordinary modes of manipulation heretofore known or used.
My machine is constructed as follows, to wit, I make a strong platform on the floor of the length of fifteen feet and six feet wide. or any other desirable length or width. of plank Timber or any other suitable material marked on the plan A. from the four corners of the platform raise four strong posts marked B. of suitable materials. which are secured by strong frame timbers at or near their top. or they may when convenient pass by these timbers and be firmly inserted into the timbers of the floor above. The frame timbers at the top are marked, the two end ones C.C. and the two side ones c.c. The end frame Timbers C.C. support the cylinder D. which is made by gudgeons at the end to revolve on suitable metallic grooves or fastenings on said timbers. By the application of power to the crank marked a. or the drums on the shaft marked b.b. The cylinder D may be made a continued Drum. of suitable size as presented in the model and drawings. or it may be a metallic shaft with [illegible] drums on it. to carry the bands marked e e. and from this cylinder the power is imparted to carry the whole of the machinery. E is the stationary working board or plank. standing at an angle of about forty five degrees. well secured on the platform at the bottom and supported behind by any suitable braces or supporters. F is a moveable working board or plank placed at a similar angle moved by the machinery herein after described. and sliding at the bottom in the groove marked d. and at the top on a rail raised and secured in any convenient manner. These boards may be of any desired thickness or dimensions at the pleasure of the operators. The dimensions of these and all other parts as appear to me convenient are represented in the model and drawings.
Behind the boards the operators stand to manage the skins and materials to be wrought. G. G. G. are planks made of strong wood or other materials sufficiently braced. that project two of them from the back upright parts and the other from the back upper frame timber. for the purpose of supporting the cylinders drums and double cranks to carry the shafts or plungers on the ends of which are placed. the Rollers Brushes hard pieces of wood sleekers or other substances for finishing the work. But they may well and perhaps with advantage be dispensed with. by placing the cylinders, Drums and double Cranks for carrying the shafts afore= said a little lower and directly between the rear upright posts for the accommodation of which operation the cylinder D. with the cross tim= bers that support it may be placed as much higher. as may be requi- red. Bands or straps of Leather or any other suitable material marked e.e. pass over the drum D and the drums H.H. to carry the machine= ry. The drums H.H are fastened on the shafts II. One of each of said drums. is to be used when the machinery is at work. and the others when it is at rest. The Shafts I.I. may be coupled together at their central point of meeting at G. or left unconnected there and used separately. The figures f.f. are double cranks on the shafts II. J.J. are the shafts or plungers on the lower ends of which are placed the Rollers Brushes. hard pieces of wood. sleekers or other things which operate on the working boards. to prepare polish and finish the materials to be wrought. g.g. are the Rollers Brushes hard pie- ces of wood. sleekers and other substances used and changed at pleas= ure. by any convenient mode of shifting them in the ends of the - shafts or plungers for operating on and finishing the work.
K.K are oblique beams. or shafts passing from the front. top frame timber nearly at right angles with the working shafts or plungers. to support the spiral springs .h.h. The spiral springs. h.h &c are provided to give to the working shafts or plungers. in the operation the necessary pressure and relaxation of pressure while in operation and passing over the working boards. The moveable working board F. slides from side to side under the working shaft. or plunger. so that the roller or other thing at the lower end of the shaft may work on the whole surface of the skin or other material to be finished. which when work- ing on that board is fastened thereto. This board is moved as follows. a Kam i at the end of the shaft I. I. plays on the spring j. which at every revolution. sinks the wire k on to and turns the wheel l. which is fastened on to one end of a shaft. at the other end of which under

8719X the board F. is the cogged wheel - m. turning under a ratchet which is fas
tened to and moves the board F by moderate degrees until it is entirely
moved from under the shaft or plunger which operates over it. A
catch is placed behind the wheel I. to prevent it from turning back while
the spring K is detached from the wheel I. When the moveable board has
passed entirely by the shaft or plunger. or as far as the operator desires.
any simple machinery may be applied to detach the catch and the spring
K. at the same time from the cogs of the wheel I when the movable
board will be carried back to its original station by a suitable weight
attached by a line or strap to the cylinder n around which it winds
up and raises the weight while the moveable board is progressing out
ward. By means of my combination of machinery an operator of
common skill may with greatly increased speed and accuracy of work
go through. the process of softening graining. boarding polishing and
finishing skins hides &c used to make morocco and other soft leather
and all kinds of curried Leather.

In testimony that the above is a true description of my said improve
ment. I have hereunto set my hand this twenty third day of January
in the year of our Lord one thousand eight hundred and thirty five Exd. Witnesses WH. George W. Adams — Cushman Bassett Augustus Peabody (Drawing). (1484 words)

1.80